April 27, 1937.  A. B. ALLAN ET AL  2,078,593
POULTRY HOUSE
Filed Feb. 9, 1935
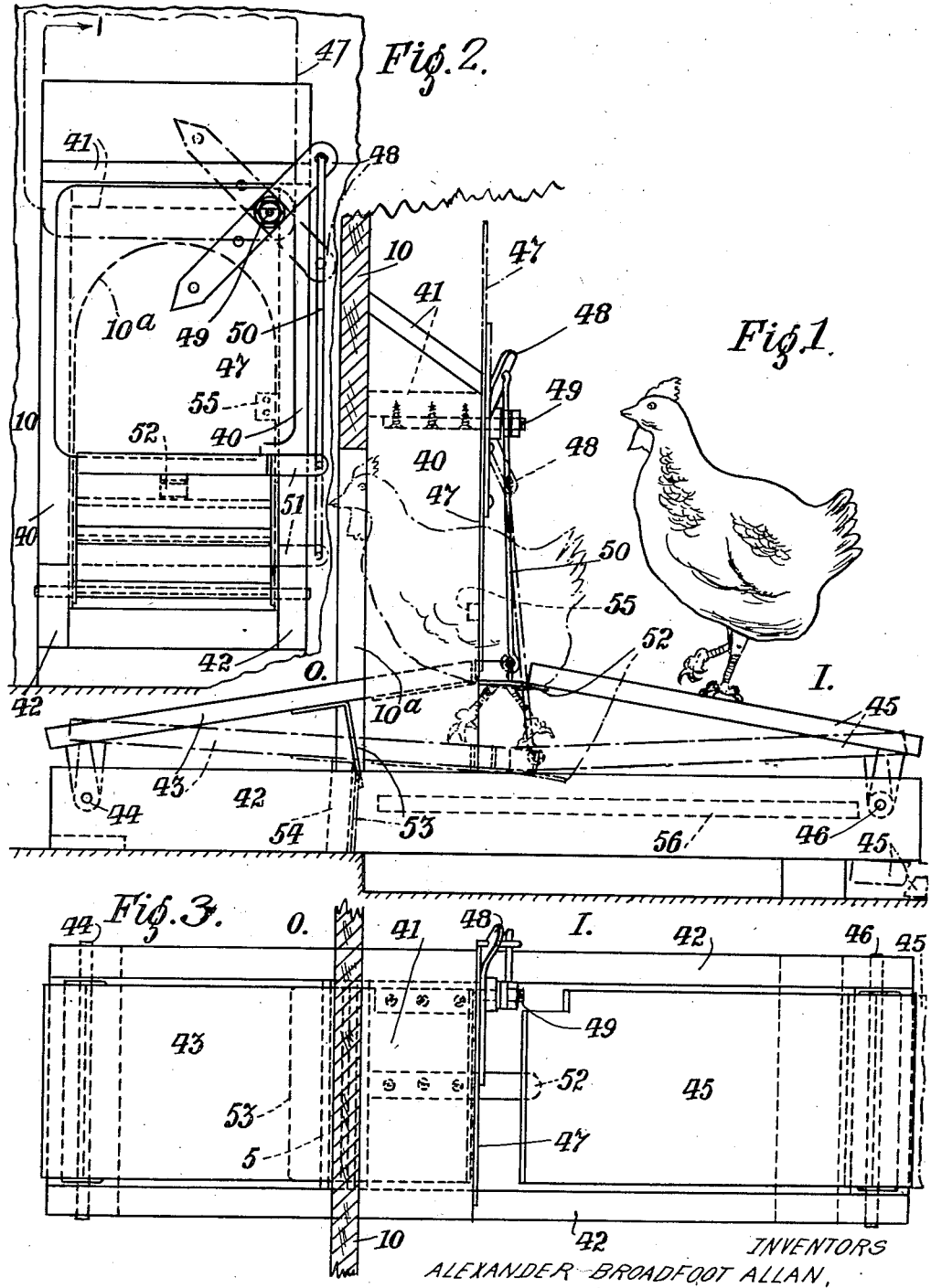
INVENTORS
ALEXANDER BROADFOOT ALLAN,
JAMES MELDRUM HOWIE,
by John D. Brady
Attorney Patented Apr. 27, 1937

2,078,593

UNITED STATES PATENT OFFICE 2,078,593

POULTRY HOUSE

Alexander Broadfoot Allan, Newton Stewart, and James Meldrum Howie, Dunlop, Scotland Application February 9, 1935, Serial No. 5,820
In Great Britain February 10, 1934

4 Claims. (Cl. 119—22)

This invention relates to houses for poultry, game, and other birds, such houses being hereinafter and in the claims hereof referred to for simplicity as poultry houses.

An object of the invention is to provide a poultry house whose entrance and exit opening remains normally closed but can be opened simply by the action of an incoming or outgoing fowl and to provide in association with the entrance and exit opening outer and inner operatively interconnected movable platforms affording a path for the fowls.

Another object is to provide for said opening a shutter to which a platform is operatively connected, the arrangement being such that when a fowl treads upon either platform the shutter is thereby opened.

Another object is to provide a poultry house which will be adapted to prevent in a convenient manner the exit of fowls, whenever desired, and the entry of vermin, the means provided being such that fowls still outside are free to enter.

Other objects of the invention will appear from the following specification and claims.

In order that the invention can be clearly understood, a structure according thereto will now be described, by way of example, with reference to the accompanying drawing, in which:—

Fig. 1 is an elevation of the structure, a portion of the associated poultry house being shown in vertical section on the line I of Fig. 2.

Fig. 2 is an elevation of the parts shown in Fig. 1 as viewed from the inside of the house.

Fig. 3 is a top plan of the parts shown in Figs. 1 and 2.

A portion of the wall of a poultry house, to which the structure shown is attached, is denoted by 10 and an opening entrance and exit therethrough by 10ª. The inside and outside of the house are denoted respectively by I and O.

In this form of structure, the entrance and exit opening is bounded by two spaced uprights 40 at the sides and by lintel members 41 on top, the uprights being secured to two horizontal lateral members 42, which form with the uprights and lintel a rigid frame. The floor of the entrance and exit opening is constituted by an outside platform 43, which extends between the uprights 40 from a pivotal mounting 44 at its front (or outside) end. An inside platform 45 extends towards the outside platform from a pivotal mounting 46 at its rear (or innermost) end. The mountings 44, 46 are provided at opposite ends of the horizontal members 42.

The exit and entrance opening is associated with a shutter 47 which is mounted on a pivot bolt 49 secured to the lintel 41 and is arranged to extend downwards behind and close to the uprights past the rear end of the outside platform. The shutter has a laterally extending arm 48 which is connected by a link 50 to a lateral arm 51 provided at the rear end of the outside platform. The latter is also provided with a rearwardly extending support member 52 upon which the front end of the inside platform normally rests.

The weights and leverage of the platforms and shutters are so related that the gravity action of the shutter overbalances that of the two platforms, and the degree of overbalance may be such that a weight of 2 lbs. applied to either platform about the middle thereof will lower the platforms and raise the shutter. Removal of the weight at once results in the return of the shutter and platforms to their "closed" position.

The shutter 47 is capable of closing the area of the opening above the outside platform 43 when the latter is fully raised. The area below the outside platform is then closed by a subsidiary shutter 53 provided on the bottom of the outside platform, the said subsidiary shutter slightly overlapping a rigid cross bar 54 at the bottom of the entrance and exit opening.

The main shutter, on its outer face, has a stop 55 arranged to abut against the frame members in the fully opened and closed positions of the shutter. The said stop accordingly defines the limits of movement of the movable parts of the structure.

A stationary floor board 56 arranged between the frame members 42 and below the normal working position of the inside platform 45 extends from about the pivotal mounting 46 thereof to the vicinity of the subsidiary shutter 53.

In the normal position of the movable parts, as shown in full lines in the drawing, the main shutter 47 is lowered and the platforms are raised, so that the subsidiary shutter 53 must also be raised. Thus, the entrance and exit opening is completely closed. If a fowl treads upon and walks along either the inside or outside platform, both are lowered, as shown in dot-and-dash lines, and the main shutter is simultaneously raised; also, the subsidiary shutter lowers with the outside platform. Hence, the entrance is opened and the fowl can enter or leave the house, as the case may be, the transfer of its weight from one to the other of the platforms—which, when lowered, almost abut and provide practically a continuous path—maintaining the opening open until the fowl moves off the second platform. Then the platforms rise again immediately, and the main and subsidiary shutters close.

The weight of small animals such as rats is insufficient to cause the platform and shutter to open.

Whenever it is desired to prevent the fowls from leaving the house, one need simply turn the inside platform around its pivotal mounting away from the entrance. When this is done, the inside platform is rendered inoperative as a means of opening the main and auxiliary shutters and exit is prevented. Nevertheless, the outside platform would still be operative, so that, if the inside platform were turned away in the evening, fowls could thereafter enter their house for the night, but could not leave until the attendant returned in the morning. By virtue of this construction and arrangement, destruction of the fowls by animals such as foxes can effectively be stopped; because, in the first instance, the nature of the fox is such that it will not enter a small opening having a quick-lifting shutter; and, in the second place, the fowls are prevented from leaving the house in the early morning, when a fox may be about, before the arrival of the attendant.

The frame, platforms, shutters and associated parts of the structure may be constructed as a self-contained unit and can be applied as such to existing poultry houses.

Various modifications can be made in constructional details. For example, there may be provision such as a bolt, catch, lock or the like for positively locking, if so desired, the shutter or shutters against opening.

We claim:—

1. In or for a poultry house, a structure with an entrance and exit opening, a shutter for said opening movably mounted on said structure, outer and inner platforms pivotally mounted at their distal ends on said structure and nearly abutting at their proximal ends so as to afford a path through the opening, a part on one platform on which part the other platform is adapted normally to rest, and a connection between said other platform and the shutter such that the weight of a fowl applied to either platform opens the shutter, the arrangement being such that the normally resting platform can be turned at will into an inoperative position.

2. In or for a poultry house, a structure with an entrance and exit opening, a shutter for said opening movably mounted on said structure, outer and inner platforms movably mounted thereon and affording a path through the opening, a part on one platform constituting a support for the inner platform upon the outer platform at the proximal platform ends, and a connection between the outer platform and the shutter such that the weight of a fowl applied to either platform opens the shutter, the arrangement being such that the inner platform can be moved at will into an inoperative position.

3. A structure according to claim 1, in which the inner platform rests on the outer platform, the outer platform is connected to the shutter and the inner platform can be turned at will into an inoperative position.

4. In or for a poultry house, a structure with an entrance and exit opening, a shutter for an upper area of said opening movably mounted on said structure, outer and inner platforms pivotally mounted at their distal ends on said structure and nearly abutting at their proximal ends so as to afford a path through the opening, an auxiliary shutter for a lower area of said opening mounted on the outer platform, a part on one platform constituting a support for the inner platform upon the outer platform at the proximal platform ends, and a connection between the outer platform and the main shutter such that the weight of a fowl applied to either platform opens both shutters, the arrangement being such that the inner platform can be turned at will into an inoperative position.

ALEXANDER BROADFOOT ALLAN.
JAMES MELDRUM HOWIE.